United States Patent Office 3,410,182
Patented Nov. 12, 1968

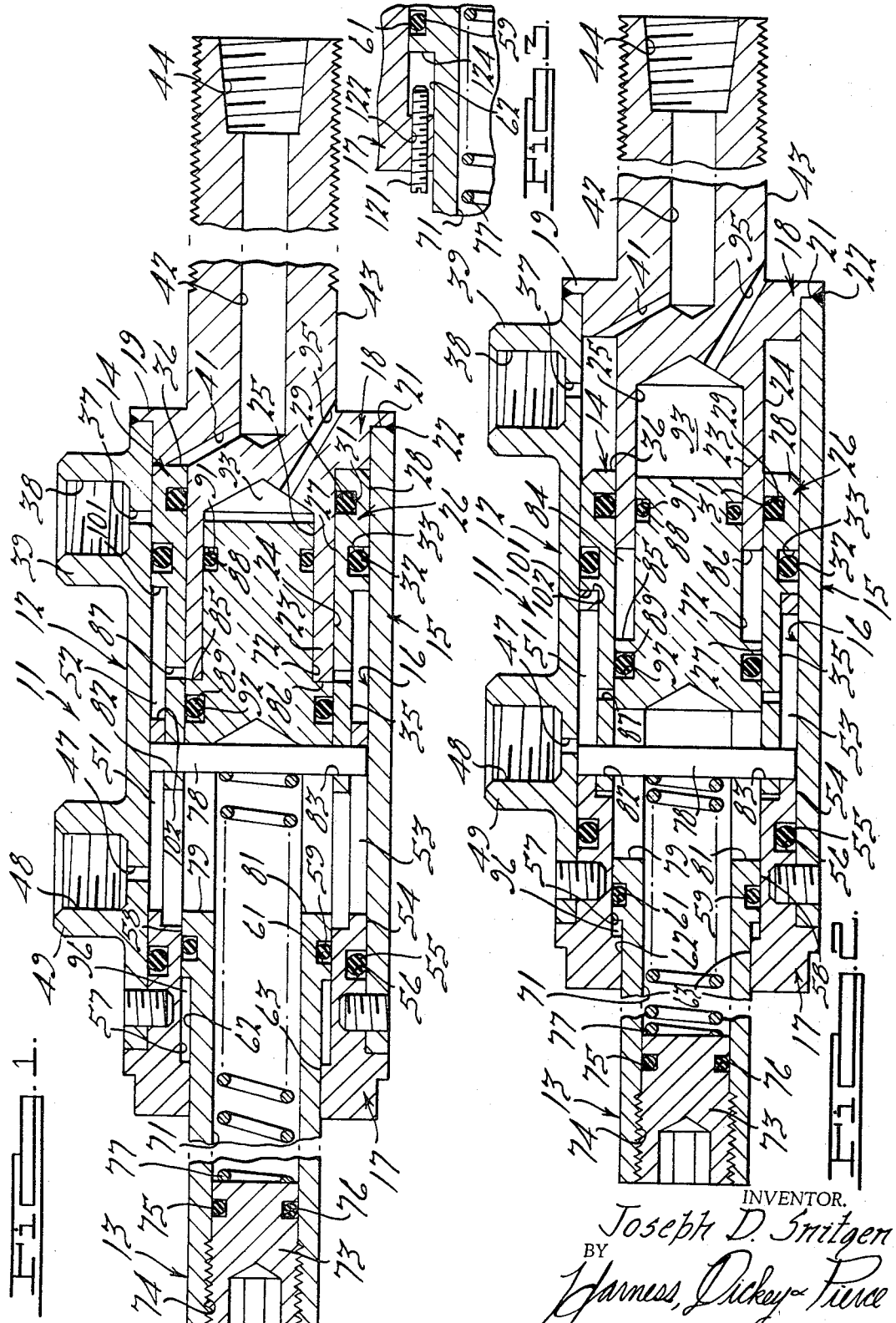

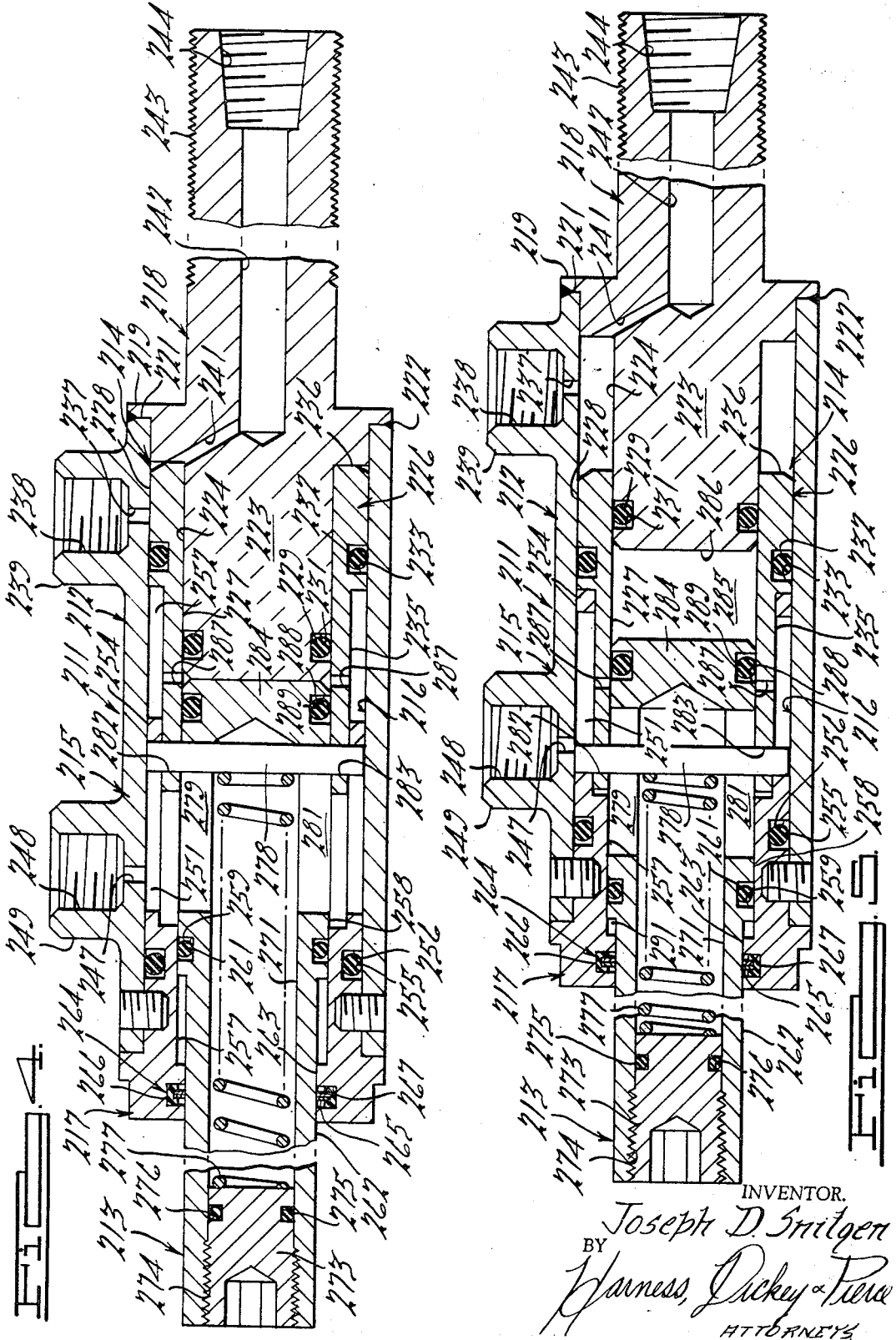

3,410,182
FLUID STOP MECHANISM
Joseph D. Snitgen, 9656 Artesian,
Detroit, Mich. 48228
Filed Nov. 14, 1967, Ser. No. 682,748
13 Claims. (Cl. 92—13)

ABSTRACT OF THE DISCLOSURE

A fluid stop mechanism comprised of a fluid motor having a driven member and a stop member that is adapted to engage a workpiece or the like and exert very low force agianst the workpiece upon contact but which develops a substantial force in resistance of any tendency for the workpiece to move. A coil spring is interposed between the driven member and the stop member for exerting the contact force and for permitting relative movement between the members upon contact of the stop member with the workpiece. The stop member forms a piston in a variable volume fluid chamber in which an incompressible fluid is contained. A port extends from this chamber and through the driven member, which port is adapted to be closed upon the relative movement between the stop member and the driven member to provide a hydraulic lock in this fluid chamber. This hydraulic lock precludes any tendency for the stop member to undergo any reverse movement.

BACKGROUND OF THE INVENTION

This invention relates to a fluid stop mechanism and more particularly to an adjustable fluid stop for contacting and holding workpieces or the like.

In many instances it is desirable to provide a stop mechanism that will automatically move into contact with a workpiece or the like without exerting any more than a relatively low force against it, but will nevertheless substantially preclude movement of the workpiece towards the stop when substantially greater forces are exerted on the workpiece by some other means. Examples of the use of such stops are as backups in production spot welding equipment, as locating supports for parts positioned in machining or assembly fixtures, and so forth.

It is, therefore, a principal object of this invention to provide an improved stop mechanism for accomplishing the above.

It is a further object of this invention to provide a hydraulic stop mechanism that exerts a relatively low force upon the workpiece unless the workpiece is urged against the stop.

It is another object of this invention to provide a stop mechanism that is automatically adjustable or self-compensating for variations in workpiece position or shape or size.

SUMMARY OF THE INVENTION

A fluid stop mechanism embodying this invention is particularly adapted to contact and hold a workpiece or the like. Such a stop mechanism includes a fluid motor having a driven member that is movable between first and second positions in response to fluid pressure. A stop member which is adapted to engage a workpiece is connected for movement with the driven member by means of motion transmitting means which transmits motion from the driven member to the stop member until the stop member reaches a predetermined position and, thereafter, provides for movement of the driven member relative to the stop member. A fluid chamber adapted to receive a substantially incompressible fluid includes an element operatively connected for movement with the stop member and contained within the fluid chamber for altering the volume of the fluid chamber upon movement of the stop member. Fluid control means control the flow of fluid from the fluid chamber, which fluid control means is movable from an open position to a closed position wherein fluid is trapped in the fluid chamber. The fluid stop mechanism is completed by means for moving the fluid control means from its open position to its closed position upon movement of the driven member relative to the stop member for fluid resistance of movement of the stop member in a reverse direction after the stop member reaches its preselected position.

BRIEF DESCRIPTION OF THE DRAWINGS

FIGURE 1 is a longitudinal cross-sectional view of a first embodiment of this invention.

FIGURE 2 is a cross-sectional view, in part similar to FIGURE 1, showing the fluid stop mechanism in another position.

FIGURE 3 is a partial cross-sectional view, in part simliar to FIGURE 1, showing another embodiment of the invention.

FIGURE 4 is a cross-sectional view, in part similar to FIGURE 1, showing a still further embodiment of the invention.

FIGURE 5 is a cross-sectional view, in part similar to FIGURE 4, showing this embodiment in another position.

DETAILED DESCRIPTION OF THE PREFERRED EMBODIMENTS

Referring first to the embodiment of FIGURES 1 and 2, a hydraulic stop mechanism embodying this invention is identified generally by the reference numeral 11. The stop mechanism 11 generally includes a supporting housing assembly 12, a stop member 13 and a fluid motor 14.

The supporting housing assembly 12 comprises a generally cylindrical member 15 having a cylindrical bore 16 that is closed at its opposite ends by end closure members 17 and 18. The end closure member 18 has an enlarged head portion 19 that is abuttingly engaged with a shoulder 21 formed at one end of the member 15. The closure member 18 is affixed to the cylindrical member 15 in any suitable manner, as by a circumferential weld 22. The end closure member 18 is formed with an annular projection 23 that extends from the head portion 19 into the bore 16 and which has a cylindrical outer surface 24 that is spaced radially inwardly of the bore 16. A counterbore 25 extends through the portion 23 and terminates adjacent the head portion 19.

An annular piston or driving member of the fluid motor 14 is indicated generally by the reference numeral 26. The piston 26 has a cylindrical bore 27 for slidably supporting the piston 26 upon the cylindrical projection 23 of the end closure member 18. A cylindrical outer surface 28 of the piston 26 is slidably supported within the bore 16. An O-ring seal 29 is received in an internal circumferential groove 31 formed at the outer end of the piston 26 for sealing engagement with the surface 24 of the end closure projection 23. An O-ring seal 32 is supported within a circumferential groove 33 formed in the outer periphery of the piston 26 to sealingly engage the bores 16. The portion of the outer surface of the piston 26 to the right of the groove 33, as viewed in the drawings, is reduced in diameter to provide a slight clearance between this surface and the bore 16 for a reason that will become more apparent as this description proceeds. On the opposite (left hand) side of the groove 33, the piston 26 is formed with a reduced diameter section 35.

As has been noted, the piston 26 forms a portion of the fluid motor 14. In order to drive the piston 26 in one direction of its stroke, fluid may be admitted to act against a head 36 formed at the right hand side of the piston through the clearance between the piston surface 28 and the bore 16 by means of a fluid inlet passage 37. The fluid inlet passage 37 terminates in a tapped opening 38 formed in an embossment 39 of the housing member 15. Any type of known fluid inlet fitting (not shown) may be threaded into the opening 38 to permit the introduction of fluid under pressure through the passage 37 to the right hand side of the piston head 36 through the clearance between the surface 28 and the bore 16. The seals 29 and 32 preclude any leakage to the left hand side of the piston.

An alternative fluid inlet passage 41 is formed in the end closure member 18, which alternative inlet port extends from the side adjacent the piston head 36 to a longitudinally extending passage 42 formed in a cylindrical extension 43 of the end closure member 18. A tapped opening 44 is formed at the outer end of the inlet passage 42. Any suitable fluid inlet fitting may be threaded into the tapped opening 44 to permit the fluid introduction through the passages 42 and 41. Depending upon which of the inlet openings 38 or 44 is used, the other opening may be closed by a plug (not shown).

A fluid pressure return passage 47 extends through the housing member 15 into the bore 16 on the side adjacent to the extreme left-hand position of the piston 26. The passage 47 terminates in a tapped opening 48 adapted to receive any suitable fluid fitting (not shown) and formed in an embossment 49 of the housing member 15. The passage 47 terminates at its other end in an annular cavity 51 that is formed by the bore 16. The cavity 51 is in fluid communication with an adjacent fluid cavity 52 through a plurality of longitudinally extending openings (not shown) formed in an annular portion 54 of the closure member 17. The end closure member 17, which is affixed to the housing member 15 in any suitable manner such as by threaded fasteners, carries an O-ring seal 55 in a circumferential groove 56 formed adjacent the portion 54 and engaging the bore 16 to assist in precluding fluid leakage from the cavity 51.

The end closure member 17 is formed with a cylindrical bore 57 in which an enlarged headed portion 58 of the stop member 13 is supported for reciprocation. An annular O-ring seal 59 received in a circumferential groove 61 of the stop member portion 58 engages the bore 57 to further assist in precluding fluid leakage. Adjacent the stop member portion 58, the stop member 13 is formed with a reduced diameter cylindrical portion 62 that passes through a cylindrical opening 63 formed in the closure member 17.

A cylindrical bore 71 extends through the cylindrical portion 62 and through the portion 58 of the stop member 13 and terminates adjacent a reduced diameter cylindrical portion 72 that is guided in the closure member counterbore 25. The outer end of the bore 71 is closed by a plug 73 that is threaded into a tapped opening 74 formed in the stop member 13. An O-ring seal 75 is received in a circumferential groove 76 in the plug 73 to effect a fluid seal in this area. A coil compression spring 77 is received in the bore 71 and bears against the plug 73 at one end. The opposite end of the spring 77 bears against a pin 78 that extends through elongated slots 79 and 81 formed in the opposite sides of the portion 58 of the stop member 13 forming a lost motion connection between the pin 78 and the stop member 13. The opposite ends of the pin 78 are fixed in cylindrical bores 82 and 83 formed at the inner end of the portion 35 of the piston 26.

The portion 72 of the stop member 13 that extends into the closure member bore 25 defines a variable volume annular fluid chamber 84 (FIGURE 2) bounded at one of its ends by a shoulder 85 formed on the stop member 13 between the portion 58 and the portion 72. The other end of the chamber 84 is defined by a shoulder 86 formed at the inner end of the closure member 18. A port 87 in the portion 35 of the piston 26 is adapted to extend from the chamber 52 into the chamber 84 when the parts are in certain relative positions, as will become more apparent as this description proceeds. Fluid leakage from the opposite ends of the chamber 84 is precluded by O-ring seals 88 and 89 contained within circumferential grooves 91 and 92 formed in the portions 72 and 58, respectively, of the stop member 13. A volume 93 at the end of the bore 25 is vented to the atmosphere through an atmospheric vent 95 for a reason which will become more apparent as this description proceeds. In a like manner, an annular chamber 96 around the stop member surface 62 and between the closure member 17 and stop member portion 58 is vented to the atmosphere in any suitable manner.

OPERATION

The stop mechanism 11 may be used in any of a number of different applications wherein the stop member 13 is desired to engage a workpiece with relatively low force but is effective in precluding movement of the workpiece in at least one direction. As an example of such an application, the stop mechanism 11 may be used in conjunction with a back-up die of a press or the like. It is to be understood that this use is merely exemplary and that various other uses for this device will present themselves to those skilled in the art.

FIGURE 1 illustrates the device 11 in its retracted position. To extend the stop member 13 into engagement with a respective workpiece, fluid is admitted under pressure against the piston head 36 through the port 37 or 42, depending upon which inlet port is being used. The fluid may be introduced from any known fluid source through a two-way valve and the port 47 is simultaneously vented to the sump. Upon the application of hydraulic pressure, the piston 26 will move to the left driving fluid from the chambers 51 and 52 out the return port 47. The coil spring 77 will transmit movement of the piston 26 from the pin 78 to the stop member 13. The piston 26 and stop member 13 therefore, move in unison. During this movement the stop member shoulder 85 will move away from the end closure shoulder 86 causing the volume of the annular fluid chamber 84 to increase. The driving hydraulic fluid enters this chamber through the port 87. Since the chambers 93 and 96 are vented to the atmosphere, the change in volume of these chambers will not interfere with this movement.

The movement of the stop member 13 in unison with the piston 26 will continue until the stop member 13 contacts the workpiece. When this occurs, the spring 77 will yield permitting the piston 26 to move relative to the stop member 13 (FIGURE 2). Under this condition, the port 87 will become closed and fluid will be locked in the annular cavity 84 between the shoulders 85 and 86, the stop member portion 72 and bore 27. The piston 26 may continue its outward movement until a shoulder 101 abuttingly engages a shoulder 102 formed at the end of the closure member.

The force the stop member 13 exerts upon the workpiece will be only the force exerted by the spring 77 which may be adjusted by appropriately positioning the plug 73. If the workpiece, however, tends to move in a direction compressing the spring 77 which corresponds to return movement of the stop member 13, such movement will be precluded by the incompressible fluid contained within the cavity 84. Hence, an extremely high force will resist any tendency for the workpiece to move the stop member 13 in a return direction.

In order to release the stop 11, the control valve for the fluid motor 14 is reversed and fluid is admitted under pressure through the passage 47. The appropriate passage 37 or 41 will then be vented to the sump. The piston 26 will, therefore, be driven to the right. During the initial movement of the piston 26, the stop member 13 will remain in position and the spring 77 will be permitted to elongate. After sufficient movement of the piston 26 to the right takes place, the pin 78 will traverse the slots 79 and 81 and eventually the stop member 16 will be retracted along with the piston 26. At the time the stop member 13 begins its return movement, the port 87 will be aligned with the cavity 84 and the fluid that was previously trapped in the cavity 84 may freely flow from this cavity without interfering with the return movement.

In the described embodiment, the stop member 13 continues its outward movement until it actually encounters the workpiece. Thus, in the previously described embodiment the stop member 13 will function as an adjustable stop and will compensate for variations in spacing between the workpiece and the device 11 without changing the pressure the stop member 13 exerts upon the workpiece. In some embodiments it may be desirable to have the stop member 13 cease its movement after a predetermined travel. The embodiment shown in FIGURE 3 accomplishes this result. In substantially all other respects, the embodiment shown in FIGURE 3 is similar to the previously described embodiment and like parts have been identified by the same reference numerals and will not be described again. For this reason, only a portion of this embodiment is illustrated to show the differences from the previously described embodiment.

In this embodiment, an adjustable stop screw 121 is tapped into a threaded opening 122 formed in the closure member 17. The inner end of the screw 122 extends into an annular volume 123 formed between the surfaces 62 and 57 of the stop member 13 and closure member 17, respectively. A shoulder 124 formed on the stop member 13 will contact the inner end of the adjustable screw 121 and preclude further movement to the left. When this occurs, the spring 77 will yield and the device will operate as in the previously described embodiment.

The embodiment shown in FIGURES 1 and 2 is particularly useful in applications where extremely accurate location in a direction transverse to the axis of reciprocation of the stop member is required. Such accurate transverse location is particularly important when the stop mechanism is used to back up a die button or for the application in punching operations. In addition to being extremely accurate in this direction, the described embodiment can resist substantial transverse forces due to the relatively large bearing area provided between the stop member 13 and the end closure bore 57, piston bore 27 and end closure counterbore 25. In some instances, for example where the fluid stop is used as a back-up spot welding cylinder, this large bearing area is not required. The embodiment shown in FIGURES 4 and 5 is particularly adapted for use in this type of application. In addition, the construction of this embodiment eliminates the need for certain of the atmospheric vents and reduces the number of O-ring seals required.

Referring now specifically to the embodiment shown in FIGURES 4 and 5, this embodiment of the hydraulic stop mechanism is identified generally by the reference numeral 211. The stop mechanism 211 generally includes a supporting housing assembly 212, a stop member 213 and a fluid motor 214.

The supporting housing assembly 212 comprises a generally cylindrical member 215 having a cylindrical bore 216 that is closed at its opposite ends by end closure member 215 in any suitable manner, as by a circumferential enlarged head portion 219 that is abuttingly engaged with a shoulder 221 formed at one end of the member 215. The closure member 218 is affixed to the cylindrical member 215 in any suitable banner, as by a circumferential weld 222. The end closure member 218 is formed with a cylindrical projection 223 that extends from the head portion 219 into the bore 216 and which has its cylindrical outer surface 224 spaced radially inwardly of the bore 216.

An annular piston or driving member of the fluid motor 214 is indicated generally by the reference numeral 226. The piston 226 has a cylindrical bore 227 for slidably supporting the piston 226 upon the cylindrical projection 223 of the end closure member 218. A cylindrical outer surface 228 of the piston 226 is slidably supported within the bore 216. An O-ring seal 229 is received in an external circumferential groove 231 formed at the inner end of the projection 223 for sealing engagement with the bore 227 of the piston 228. An O-ring seal 232 is supportetd within a circumferential groove 233 formed in the outer periphery of the piston 226 to sealingly engage the bore 216. The portion of the outer surface of the piston 226 to the right of the groove 233, as viewed in the drawings, is reduced in diameter to provide a slight clearance between this surface and the bore 216 for a reason that will become more apparent as this description proceeds. On the opposite (left hand) side of the groove 233, the piston 226 is formed with a reduced diameter section 235.

As has been noted, the piston 26 forms a portion of the fluid motor 214. In order to drive the piston 226 in one direction of its stroke, fluid may be admitted to act against a head 236 formed at the right hand side of the piston through the clearance between the piston surface 228 and the bore 216 by means of a fluid inlet passage 237. The fluid inlet passage 237 terminates in a tapped opening 238 formed in an embossment 239 of the housing member 215. Any type of known fluid inlet fitting (not shown) may be threaded into the opening 238 to permit the introduction of fluid under pressure through the passage 237 to the right hand side of the piston head 236 through the clearance between the surface 228 and the bore 216. The seals 229 and 232 preclude any leakage to the left hand side of the piston.

An alternative fluid inlet passage 241 is formed in the end closure member 218, which alternative inlet port extends from the side adjacent the piston head 236 to a longitudinally extending passage 242 formed in a cylindrical extension 243 of the end closure member 218. A tapped opening 244 is formed at the outer end of the inlet passage 242. Any suitable fluid inlet fitting may be threaded into the tapped opening 244 to permit the fluid introduction through the passages 242 and 241. Depending upon which of the inlet openings 238 or 244 is used, the other opening may be closed by a plug (not shown).

A fluid pressure return passage 247 extends through the housing member 215 into the bore 216 on the side adjacent to the extreme left-hand position of the piston 226. The passage 247 terminates in a tapped opening 248 adapted to receive any suitable fluid fitting (not shown) and formed in an embossment 249 of the housing member 215. The passage 247 terminates at its other end in an annular cavity 251 that is formed by the bore 216. The cavity 251 is in fluid communication with an adjacent fluid cavity 252 through a plurality of longitudinally extending openings (not shown) formed in an annular portion 254 of the colsure member 217. The end closure member 217, which is affixed to the housing member 215 in any suitable manner such as by threaded fasteners, carries an O-ring seal 255 in a circumferential groove 256 formed adjacent the portion 254 and engaging the bore 216 to assist in precluding fluid leakage from the cavity 251.

The end closure member 217 is formed with a cylindrical bore 257 in which an enlarged headed portion 258 of the stop member 213 is supported for reciprocation. An annular O-ring seal 259 received in a circumferential groove 261 of the stop member portion 258 engages the bore 257 to further assist in precluding fluid leakage. Adjacent the stop member portion 258, the stop member 213 is formed with a reduced diameter cylindrical portion 262 that passes through a cylindrical opening 263 formed in the closure member 217. A scraper, indicated generally by the reference numeral 264, engages the periphery of the surface 262 for a reason which will become more apparent as this description proceeds. The scraper 264 is comprised of a pair of turns of copper or some other soft metal 265 embedded in an elastomer 266 received in the groove 267 formed in the closure member 217 around the bore 263.

A cylindrical bore 271 extends through the cylindrical portion 262 and through the larger portion 258 of the stop member 213. The outer end of the bore 271 is closed by a plug 273 that is threaded into a tapped opening 274 formed in the stop member 213. An O-ring seal 275 is received in a circumferential groove 276 in the plug 273 to effect a fluid seal in this area. A coil compression spring 277 is received in the bore 271 and bears against the plug 273 at one end. The opposite end of the spring 277 bears against a pin 278 that extends through elongated slots 279 and 281 formed in the opposite sides of the portion 258 of the stop member 213 forming a lost motion connection between the pin 278 and the stop member 213. The opposite ends of the pin 278 are fixed in cylindrical bores 282 and 283 formed at the inner end of the portion 235 of the piston 226.

The bore 271 at the inner end of the stop member 213 is closed by an integral end wall 284 that extends into the piston bore 223 and which defines a variable volume fluid cavity 285 with the bore 227 and an opposing end wall 286 of the end closure member 218. Fluid leakage from the cavity 285 is precluded by the O-ring seal 229 and by a right O-ring seal 287 that is received in an annular groove 288 in the stop member portion 284 and which engages the piston bore 227. One or more fluid ports 289 extend through the piston portion 235 and are in registry with the fluid cavity 285 until the piston 226 moves relative to the stop member 213 as in the previously described embodiment. Upon this relative movement, which is permitted by the yielding of the spring 277, the stop member portion 284 will close the ports 289 and establish a fluid lock in the cavity 285. Return movement of the stop member 213 will then be precluded as in the previously described embodiment. The actual operation of this embodiment is substantially the same as the embodiments of FIGURES 1 and 2 and, for this reason, the complete operation will not be described in detail.

In this embodiment, the stop member 213 may form an electrode or back-up cylinder for a spot welding apparatus as has been previously noted. The scraper 264 will scrape any weld splatter that tends to accumulate on the stop member 213 from the surface 262 during the reciprocation of the stop member 213.

It should be noted that this embodiment eliminates the cavity 93 of the embodiment shown in FIGURES 1 and 2 and, hence, eliminates the necessity for one of the O-ring seals of the previous embodiment as well as the atmospheric vent for the cavity 93. As in the previously described embodiment, an annular chamber 291 formed around the stop member 213 adjacent the end closure 217 may be appropriately vented to the atmosphere, for example through the annular clearance adjacent the scraper 264. It should also be understood that the adjustable stop shown in the embodiment of FIGURE 3, may also be used in conjunction with a stop mechanism of the type shown in FIGURES 4 and 5.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A fluid stop mechanism comprising a fluid motor having a driven member movable between first and second positions in response to the exertion of fluid pressure upon said driven member, a stop member adapted to engage a workpiece or the like, motion transmitting means interposed between said driven member and said stop member for transmitting motion from said driven member to said stop member upon movement of said driven member from its first position to its second position until said stop member reaches a preselected position and thereafter providing for movement of said driven member relative to said stop member, a fluid chamber adapted to receive a substantially incompressible fluid, an element supported within said fluid chamber and operatively connected for movement with said stop member for altering the volume of said fluid chamber upon movement of said stop member, fluid control means for controlling the flow of fluid from said fluid chamber, said fluid control means being movable from an opened position to a closed position wherein fluid is trapped in said fluid chamber, and means for moving said fluid control means from its opened position to its closed position upon movement of said driven member relative to said stop member for locking fluid within said fluid chamber for fluid resistance of movement of said stop member in a reverse direction after said stop member reaches its preselected position.

2. A fluid stop mechanism as set forth in claim 1 wherein the motion transmitting means comprises biasing spring means.

3. A fluid stop mechanism as set forth in claim 2 wherein the biasing spring means is adapted to yield upon the contact of the stop member with a workpiece and wherein the fluid lock within the fluid chamber precludes movement of the workpiece and wherein the workpiece is engaged only with the force of said biasing spring means unless the workpiece tends to move.

4. A fluid stop mechanism as set forth in claim 2 further including an adjustable limit stop engageable with the stop member to establish the preselected position.

5. A fluid stop mechanism as set forth in claim 1 wherein the fluid control means comprises a port extending through the driven member and in registry with the fluid chamber until said driven member moves relative to the stop member, the stop member being adapted to move into registry with said port upon said relative movement for closing said port.

6. A fluid stop mechanism comprising housing means defining a cylindrical bore closed at opposite ends by end closure means, a stop member supported for reciprocation by one of said end closure means and having a portion thereof extending into said housing means, a piston member supported for reciprocation within said bore, means for selectively admitting fluid under pressure to opposite sides of said piston for effecting reciprocation of said piston, means providing a lost motion connection between said piston and said stop member including biasing spring means operatively interposed between said piston and said stop member, said lost motion connection being normally operative for effecting simultaneous movement of said piston and said stop member until said stop member reaches a predetermined position and for yielding of said spring means thereupon for permitting continued movement of said piston relative to said stop member, said stop member, said piston and said housing means defining a fluid chamber, the portion of said stop member defining said chamber being movable relative to said chamber for increasing the volume of said chamber upon movement of said stop member, fluid port means extending from said chamber for fluid communication with said chamber, and means for closing said fluid port means upon relative movement between said piston and said stop member for effecting a fluid lock in said fluid chamber to preclude return movement of said stop member.

7. A fluid stop mechanism as set forth in claim 6 wherein the fluid port means extends through the piston and wherein the means for closing the fluid port means comprises a portion of the stop member adapted to move into registry with said fluid port means for effecting closure of said fluid port means.

8. A fluid stop mechanism as set forth in claim 7 wherein the lost motion connection further comprises pin means fixed to the piston, the spring means comprising a coil spring engaging said pin means and the stop member and received at least in part in a cylindrical bore in said stop member.

9. A fluid stop mechanism comprising housing means defining a cylindrical bore, first end closure means for one end of said bore, said first end closure means defining a projection extending into said bore, said projection having an outer surface spaced radially inwardly of said bore to define an annular cavity therebetween, an annular piston member supported for reciprocation within said annular cavity, means for admitting fluid under pressure to said annular cavity on one side of said piston member for moving said piston member from a first position to a second position, a second end closure member, a stop member supported for reciprocation by said second end closure member, said stop member having a portion extending into said housing, said stop member portion being comprised of a cylindrical part slidably supported within said annular piston and a second part juxtaposed to said projection of said first end closure means, said stop member, said annular piston and said first end closure portion defining a variable volume fluid chamber, spring means operatively interposed between said annular piston and said stop member for transmitting movement of said annular piston into movement of said stop member until said stop member reaches a preselected position for thereafter providing for continued movement of said piston relative to said stop member, and a fluid port extending through said annular piston and opening into said variable volume fluid chamber when said piston and said stop member move together for the introduction of a substantially incompressible fluid to said variable volume fluid chamber as the volume of said variable volume chamber increases due to the simultaneous movement of said stop member and said piston, said port being adapted to move into registry with said stop member for establishing a fluid lock within said variable volume fluid chamber upon movement of said piston relative to said stop member for precluding return movement of said stop member.

10. A fluid stop mechanism as set forth in claim 9 further including pin means fixed to the piston and extending through at least one elongated axial slot in the stop member for providing a lost motion connection between said piston and said stop member, the spring means being engaged with said pin means and with said stop member.

11. A fluid stop mechanism as set forth in claim 9 wherein the projection of the first end closure means is formed with a bore, the second part of the stop member comprising a cylindrical portion extending into said bore for guidingly supporting said stop member within said bore, the variable volume fluid chamber comprising an annular chamber.

12. A fluid stop mechanism as set forth in claim 9 wherein the variable volume fluid chamber comprises a generally cylindrical chamber bounded by the second part of the stop member, the annular piston and the projection of the first end closure means.

13. A fluid stop mechanism as set forth in claim 1 wherein the fluid motor comprises housing means defining a cylindrical bore, the driven member comprising an annular piston supported for reciprocation within said housing means, first closure means defining a closure for one end of said housing means, the stop member being supported for reciprocation by said first closure means, second closure means for the other end of said housing means, said second closure means having a pilot portion extending into one end of said annular piston, said stop member having a portion received in the other end of said annular piston and defining with said annular piston and said pilot portion the fluid chamber, the fluid control means comprising a port extending through said annular piston.

References Cited
UNITED STATES PATENTS

| | | | |
|---|---|---|---|
| 941,731 | 11/1909 | Scott | 92—84 |
| 2,438,317 | 3/1948 | Gabriel | 92—84 |
| 2,938,996 | 5/1960 | Carswell | 92—84 |
| 3,146,681 | 9/1964 | Sheesley | 92—13 |
| 3,272,087 | 9/1966 | Culver | 92—84 |

PAUL E. MASLOUSKY, *Primary Examiner.*

UNITED STATES PATENT OFFICE
CERTIFICATE OF CORRECTION

Patent No. 3,410,182　　　　　　　　　　　　November 12, 1968

Joseph D. Snitgen

It is certified that error appears in the above identified patent and that said Letters Patent are hereby corrected as shown below:

Column 5, lines 65 and 66, cancel "member 215 in any suitable manner, as by a circumferential" and insert -- members 217 and 218. The end closure member 218 has an --. Column 5, line 70, "banner" should read -- manner --. Column 6, lines 10 and 11, "supportetd" should read -- supported --; line 21, "26" should read -- 226 --; line 58, "colsure" should read -- closure --.

Signed and sealed this 10th day of March 1970.

(SEAL)
Attest:

Edward M. Fletcher, Jr.　　　　　　　　　WILLIAM E. SCHUYLER, JR.
Attesting Officer　　　　　　　　　　　　　　Commissioner of Patents